(12) United States Patent
Nakata

(10) Patent No.: US 6,222,949 B1
(45) Date of Patent: *Apr. 24, 2001

(54) IMAGE FORMING APPARATUS THAT CAN MAKE DESIRED CONTINUOUS ENLARGEMENT COPY

(75) Inventor: Hironobu Nakata, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,834

(22) Filed: Mar. 9, 1998

(30) Foreign Application Priority Data

Mar. 12, 1997 (JP) .................................. 9-057883

(51) Int. Cl.⁷ ..................................... G06K 9/32
(52) U.S. Cl. .......................... 382/298; 358/451
(58) Field of Search .................... 382/298, 286; 358/451, 449; 707/517, 523, 525

(56) References Cited

U.S. PATENT DOCUMENTS 5,701,138 * 12/1997 Othmer et al. ................ 345/132
5,760,912 * 6/1998 Itoh ............................... 358/296
5,796,877 * 8/1998 Gusmano ....................... 382/298

FOREIGN PATENT DOCUMENTS

| 7-50777 | 2/1995 | (JP) . |
| 8-95435 | 4/1996 | (JP) . |
| 8-149232 | 6/1996 | (JP) . |

* cited by examiner

Primary Examiner—Yon J. Couso
(74) Attorney, Agent, or Firm—Sidley & Austin

(57) ABSTRACT

An image forming apparatus can carry out a continuous enlargement process by which an image of one original is enlarged and the image is formed on a plurality of sheets. According to the continuous enlargement process, a size of an original is first set, and a size of an image to be output can be input. A range of a size of an image to be output which can be input is calculated considering the size of the original and an ability of the apparatus. If the input size of the image to be output is within the range which can be input, a copy is made according to the continuous enlargement process. A user can input an arbitrary size within the range which can be input. Accordingly, the image forming apparatus can be provided which can form an image of an output size desired by a user when a size of an image of an original is to be changed and an image is formed on sheets of the number which is different from that of the original.

19 Claims, 8 Drawing Sheets

IMAGE FORMING APPARATUS THAT CAN MAKE DESIRED CONTINUOUS ENLARGEMENT COPY

BACKGROUND OF THE INVENTION

1. Field of the Invention

The present invention relates to an image forming apparatus, and particularly to an image forming apparatus that can form an image of a size desired by a user.

2. Description of the Related Art

This application is based on Application No. 9-057883 filed in Japan, the contents of which is hereby incorporated by reference.

As a conventional image forming apparatus of such a type as described above, an image forming apparatus which has a continuous enlargement function is known. The continuous enlargement function is a function of, for example, enlarging an image of one original and forming the image on a plurality of sheets.

When a user utilizes the continuous enlargement function, the user selects a desired output size, from several output sizes according to the size of an original which has been set, and inputs the selected one. The image forming apparatus enlarges an image of the original according to the desired output size and forms the image on print sheets of the number larger than that of the original.

However, when the conventional image forming apparatus is used, the user can select and input, as an output size according to the size of an original, only the standard size of a print sheet such as A4 and B4 where an image is formed on an entire surface of the print sheet of the standard size.

In other words, once the number of print sheets used for one image formation is determined, the output size is only one for each standard size of the print sheet.

Therefore, when the conventional image forming apparatus is to change the size of an image of an original and forms the image on print sheets of the number different from that of the original, the image forming apparatus cannot form the image with an output size where, for example, the image is formed on each print sheet with an excessive margin space even if desired by the user.

SUMMARY OF THE INVENTION

One object of the present invention is to prevent a user from erroneously making a setting for an image output apparatus having a function of continuously copying at variable scale magnification.

Another object of the invention is to form an image by continuously copying at variable scale magnification, with the magnification desired by a user, by an image output apparatus having a function of continuously copying at variable scale magnification.

Still another object of the invention is to form an image of an original correctly at a magnification desired by a user by an image forming apparatus.

A further object of the invention is to provide a method of forming an image by continuously copying at variable scale magnification, with the magnification desired by a user, by an image output apparatus.

A further object of the invention is to provide a method of forming an image by which an image of an original can be formed correctly at a magnification desired by a user.

Those objects of the invention are achieved by an image output apparatus having a function of continuously copying at variable scale magnification provided with components described below. Specifically, an image output apparatus according to the present invention includes: an image input unit for inputting an image; an input image size input unit for inputting a size of the image input to the image input unit; a calculation unit for calculating a range of a size of an image which can be output, based on the input size of the image; and a display for displaying the range of the size of the image which can be output, calculated by the calculation unit.

The range of the image size which can be output is calculated based on the input image size, and the calculated one is displayed. Therefore, the image output apparatus having the function of continuously copying at variable scale magnification can prevent a user from erroneously making a setting.

Preferably, the image output apparatus further includes: an output image size input unit for inputting a size of an image to be output; an image size change unit for changing the size of the image input to the image input unit based on the input size of the image to be output; and an output unit for outputting the image with its size changed.

The size of the image input to the image input unit is changed based on the input size of the image to be output. Therefore, an image can be formed by continuously copying at variable scale magnification, with the magnification desired by a user.

According to another aspect of the invention, an image forming apparatus includes: an image reader for reading an image of an original; an original image size detector for detecting a size of the image of the original; a calculation unit for calculating a range of a size of an image which can be output, based on the detected size of the image of the original; a display for displaying the range of the size of the image which can be output; an output image size input unit for inputting a size of an image to be output; an output image size controller for controlling such that input of a size out of the range of the size of the image displayed by the display is not accepted; an image size change unit for changing the size of the image of the original based on the input size of the image to be output; and an output unit for outputting the image with its size changed by the image size change unit.

The range of the size of the image which can be output is displayed based on the size of the original image, and an image is formed based on input of the output image size within the displayed range of the size. Therefore, the image forming apparatus can correctly form an image of an original at a magnification desired by a user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One example of an embodiment according to the present invention is hereinafter described referring to the figures.

Figure 1:
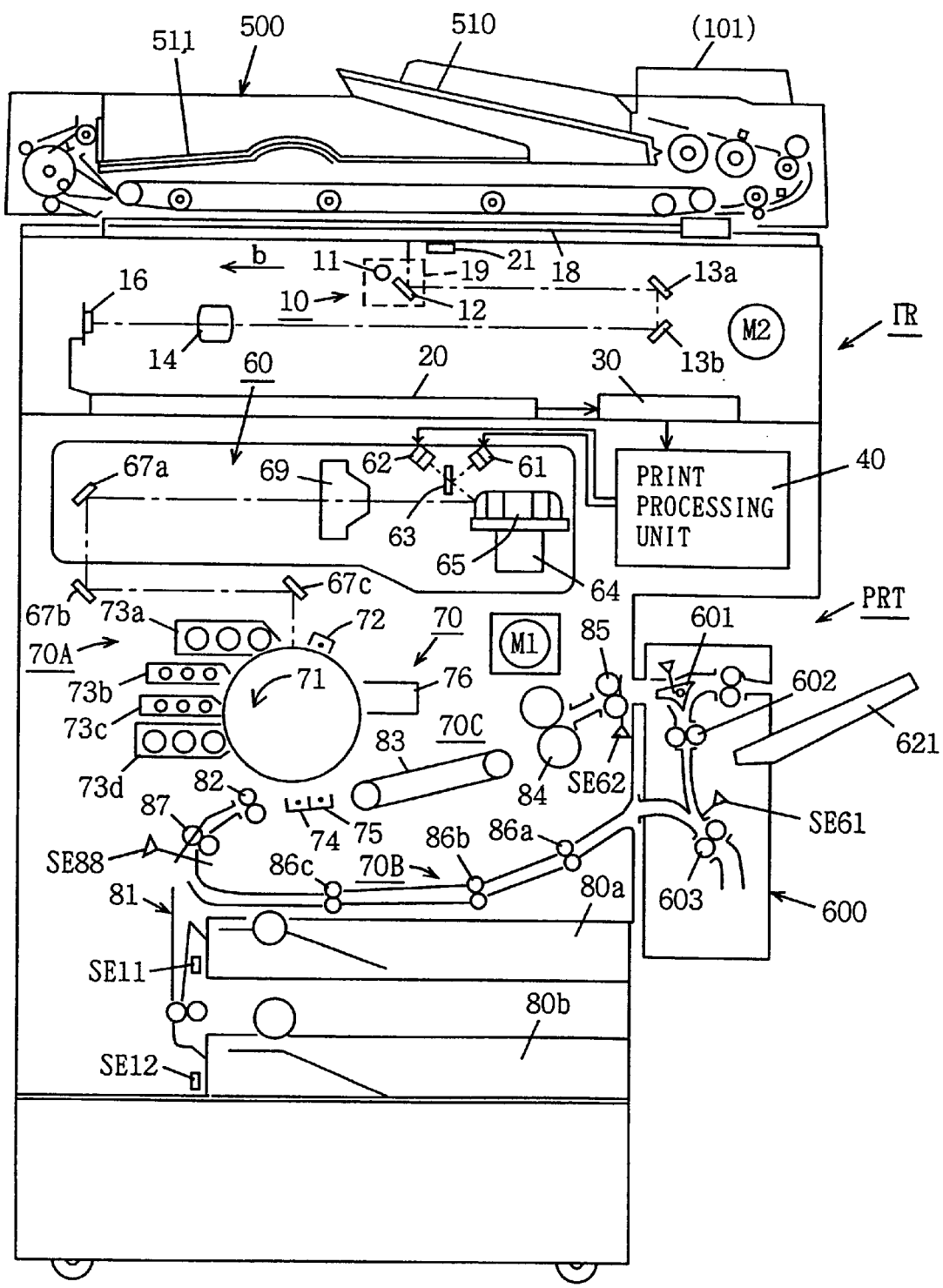
FIG. 1 is a cross sectional view showing a digital full-color copying machine as one example of an image forming apparatus according to the present invention.

With reference to FIG. 1, a copying machine 1 includes: a scan system 10 which reads an original and converts it to an image signal; an image signal processing unit 20 which processes the image signal supplied from scan system 10; an image memory 30 which stores image data output by image signal processing unit 20; a print processing unit 40 which drives semiconductor lasers 61 and 62 based on the image data output by image memory 30; an optical system 60 which directs two laser beams from semiconductor lasers 61 and 62 onto a photoreceptor drum 71 at different positions; an image forming system 70 which develops a latent image formed by exposure, and transfers and fixes it onto a sheet to form an image; an operation panel 101 provided at a top surface of a main body (provided at a top surface of copying machine 1 (in a direction perpendicular to the surface of the figure); an original transport unit 500 which transports an original and reverses the original as required; and a re-feed unit 600 which feeds the sheet again to the position where the transfer is carried out.

Scan system 10, image signal processing unit 20 and the like constitute an image reader IR, and print processing unit 40, optical system 60, image forming system 70 and the like constitute a printer PRT.

Scan system 10 is constituted of an exposure lamp 11 and a first mirror 12 that are provided for a scanner 19 moving below a platen 18, fixed mirrors 13a and 13b, a collective lens 14, a photoelectric conversion element 16 using a CCD array or the like, a scan motor M2, and the like. Note that the reference number 21 represents a white plate for correcting shading.

It is herein defined that a main scan direction refers to a direction of scanning an original which is a scan direction by photoelectric conversion element 16 and is perpendicular to the surface of the figure, and a subscan direction refers to a direction of scanning an original which is perpendicular to the main scan direction as shown by the arrow b of the figure. Image reader IR reads an image of an original by scanning with photoelectric conversion element 16 in the main scan direction, and by scanning with scanner 19 and mirrors 13a and 13b moving parallel to each other following the direction of the arrow b in the subscan direction.

The scanning speed of scanner 19 in the subscan direction is two times higher than that of mirrors 13a and 13b. When a copying magnification is to be changed, scanning by scanner 19 and mirrors 13a and 13b is each controlled such that the scanning speed is the one obtained by multiplying a scanning speed when copying at an equal-scale magnification is carried out by the inverse number of the copying magnification. Different magnifications can be set for the main scan direction and the subscan direction simultaneously for copying machine 1, if the magnifications are within a range which can be set.

Photoelectric conversion element 16 converts images of components of red (hereinafter referred to as "R"), green (hereinafter referred to as "G"), and blue (hereinafter referred to as "B") respectively to electric signals separately, and outputs the electric signals to image signal processing unit 20.

Image signal processing unit 20 electrically processes the image signals output by photoelectric conversion element 16 of scan system 10 to separate them into components of magenta (hereinafter referred to as ("M"), cyan ("C"), yellow ("Y"), and black ("Bk"), and outputs image data of each component to image memory 30. Image data of one of four components of M, C, Y, Bk above is output to image memory 30 for every one scanning of an original by scanner 19, and one print-out is completed by repeating the scanning of the original four times (sequential plane transfer system).

Print processing unit 40 drives and modulates semiconductor lasers 61 and 62 according to an image signal level of the image data of each component of M, C, Y and Bk supplied thereto. Optical system 60 is constituted of semiconductor lasers 61 and 62, a dichroic mirror 63 which makes a composite of two laser beams from semiconductor lasers 61 and 62, a polygon mirror 65 which polarizes the composite laser beam, a motor 64 which rotates polygon mirror 65, a main lens 69, and reflection mirrors 67a, 67b, and 67c, and the like.

Image forming system 70 is constituted of a develop and transfer system 70A, a transport system 70B and a fixing system 70C.

Develop and transfer system 70A is constituted of photoreceptor drum 71 which is driven to rotate in a counterclockwise direction in FIG. 1, a first corona charger 72, developing units 73a–73d, a transfer charger 74, a separation charger 75, a cleaning unit 76 and the like. Components except for photoreceptor drum 71 are placed around photoreceptor drum 71 in order from the upstream side of the direction of rotation. Developing units 73a–73d respectively correspond to four components of M, C, Y and Bk, and house the two-component developer formed of the toner and the carrier. Photoreceptor drum 71 is provided with a reference position sensor (not shown) which detects a relative position of photoreceptor drum 71.

Transfer system 70B is constituted of cassettes 80a and 80b which house sheets, size detection sensors SE11 and SE12 which detect the sheet size, a sheet guide 81, a timing roller 82, a transport belt 83, horizontal transport rollers 86a–86c which transport sheets supplied from re-feed unit 600, and the like.

Fixing system 70C is constituted of a fixing roller 84 which transports a toner image on a sheet while fixing it by heat and pressure, a discharge roller 85, a discharge sensor SE62 which detects discharging of sheets, and the like.

Re-feed unit 600 is of a circulation type which temporarily holds a sheet discharged from discharge roller 85, and transports it to horizontal transport roller 86a of transport system 70B for forming an image (printing) again. The sheet is reversed in the two-sided copy mode by re-feed unit 600, and the sheet is not reversed in the composite mode. Re-feed unit 600 is constituted of a switching claw 601 for switching from discharging to discharge tray 621, to re-feeding and by vice versa, a transport roller 602, a reverse roller 603, a reverse sensor SE61, and the like.

In the two-sided copy mode, the left edge portion of switching claw 601 is moved upward by a solenoid (not shown). Accordingly, a sheet discharged from discharge roller 85 is directed to transport roller 602, passed through transport roller 602 to reverse roller 603.

When the trailing edge of the sheet reaches reverse sensor SE61, reverse roller 603 reverses to allow the sheet to be transported toward horizontal transport roller 86a. The sheet travels through horizontal transport rollers 86b and 86c and an intervening roller 87, arrives at timing roller 82 and waits there.

At this time, next sheets follow successively with a prescribed interval. The number of sheets each having a print on one side that can wait at a copy path including transport rollers 602 and 603 as well as horizontal transport rollers 86a–86c depends on the length of the sheet and that of the copy path if there is no delay of image data. In this embodiment, the maximum number of sheets that can wait at the transport path is three. In front of intervening roller 87, a sensor SE88 which detects the leading edge of a transported sheet is provided.

Original transport unit 500 automatically transports an original placed on an original feed tray 510 onto platen 18, and discharges it to an original discharge unit 511 after the surface (lower surface) of the original is read by scanner 19.

Figure 2:
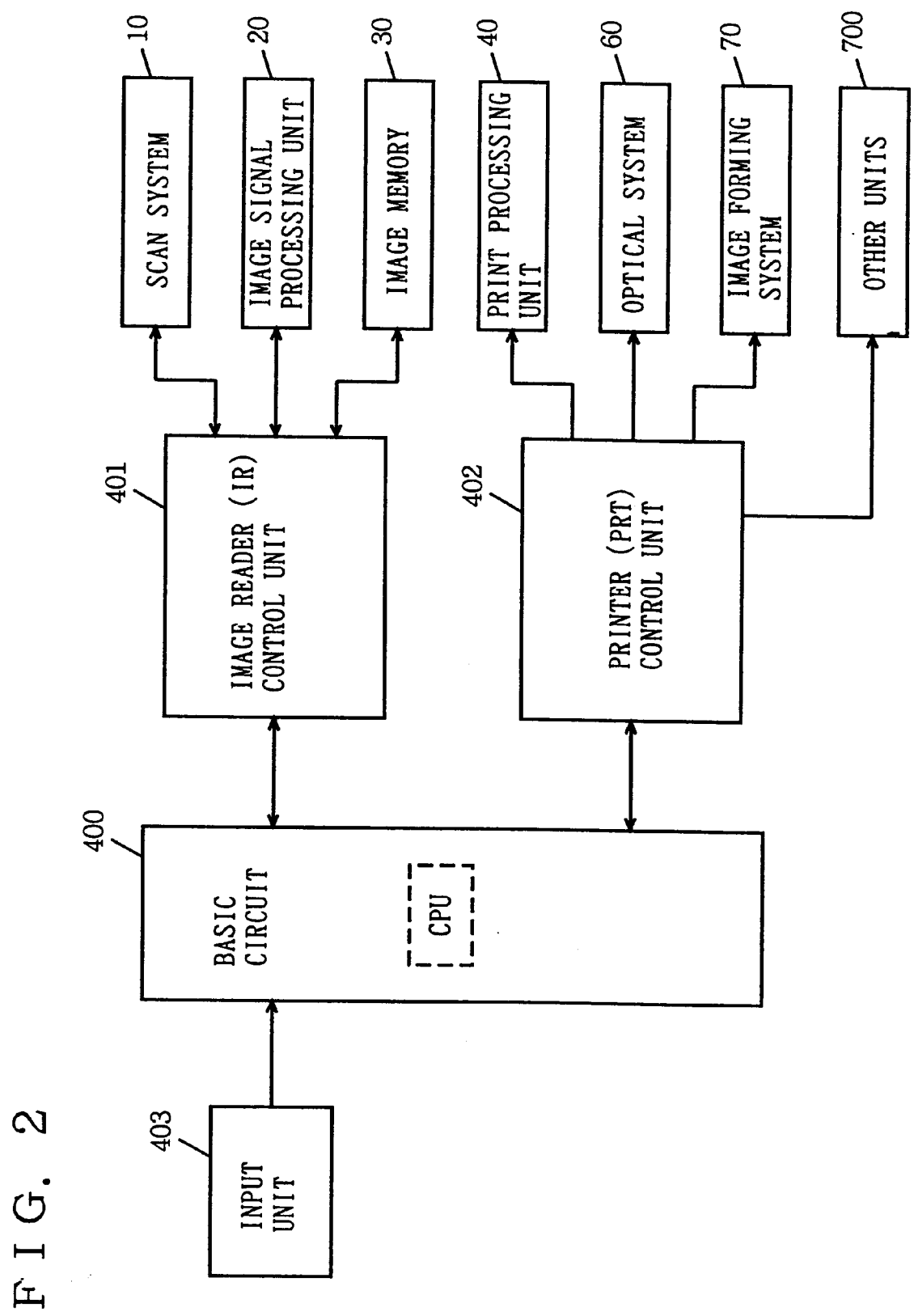
FIG. 2 is a block diagram showing a structure of a control circuit of the copying machine of FIG. 1.

FIG. 2 is a block diagram showing a structure of a control circuit of copying machine 1. Referring to FIG. 2, the control circuit is provided with a basic circuit 400. Basic circuit 400 controls each component of copying machine 1 according to a program for control. Basic circuit 400 includes an ROM which stores the control program, a CPU which carries out a control operation according to the control program, RAM which functions as a memory for work of the CPU, an input/output port, and a clock generation circuit. The internal structure of basic circuit 400 is not shown except for the CPU.

An input unit 403 constituted of various keys or the like provided for operation panel 101, an image reader control unit 401 which controls image reader IR, and a printer control unit 402 which controls printer PRT are connected to the input/output ports of basic circuit 400.

Scan system 10, image signal processing unit 20 and image memory 30 described referring to FIG. 1 are controlled via image reader control unit 401, and print processing unit 40, optical system 60, image forming system 70 and other units 700 of copying machine 1 including re-feed unit 600 are controlled via printer control unit 402.

Figure 3:
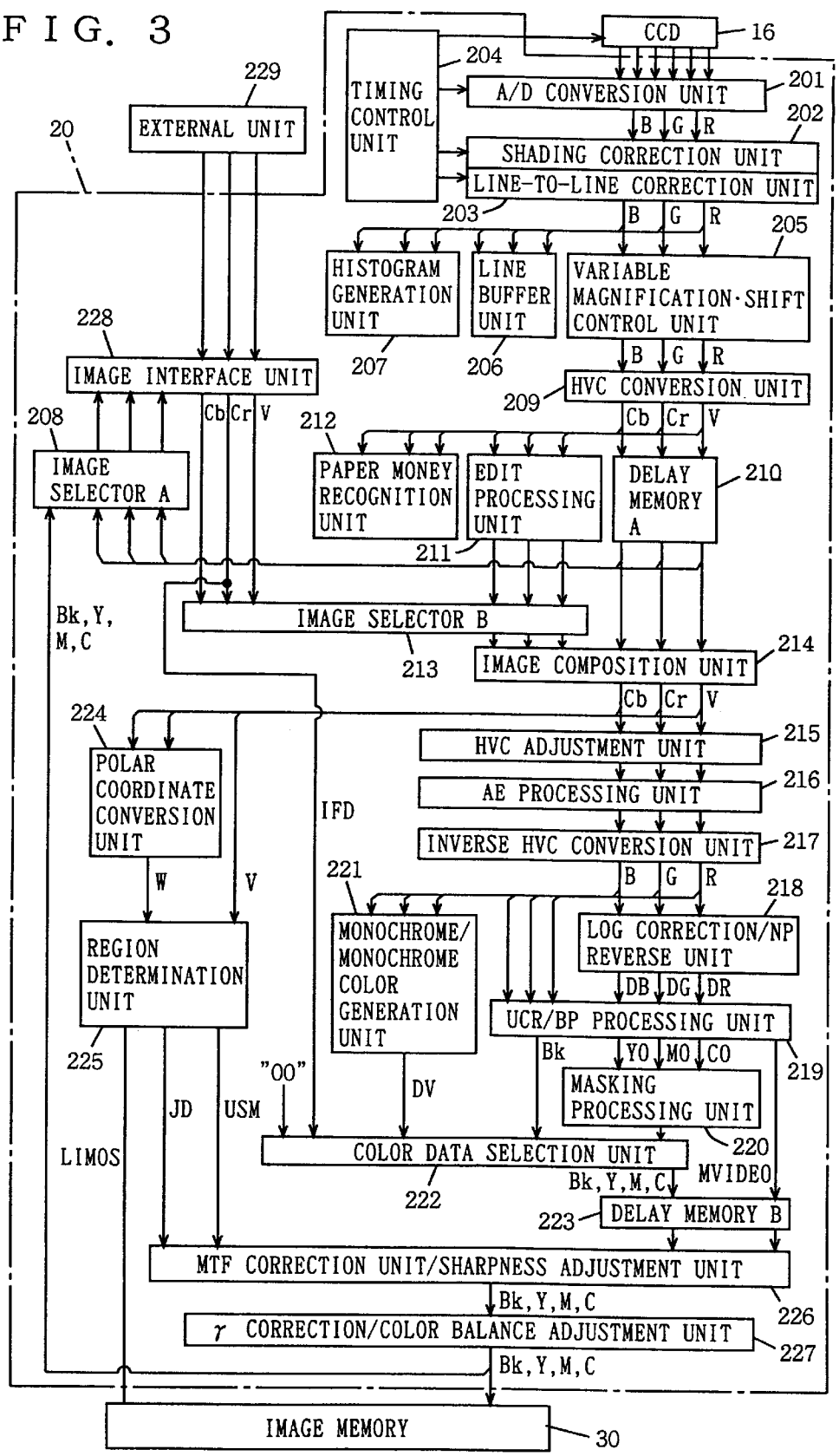
FIG. 3 is a block diagram showing a structure of an image signal processing unit of FIG. 1.

FIG. 3 is a block diagram showing a structure of image signal processing unit 20 of FIG. 1.

In copying machine 1, light reflected from the surface of an original is imaged on photoelectric conversion element (hereinafter referred to as "CCD") 16 by scan system 10 which is a reduction optical system, and an analog signal is obtained by photoelectric conversion to information on separated colors of R, G and B each.

An A/D conversion unit 201 converts image data of 400 dpi (dot per inch), output by CCD 16, obtained by photoelectric conversion to information on separated colors of R, G and B each to digital data of 8 bits (256 gradient) for each information on colors of R, G and B each, and outputs the digital data to a shading correction unit 202.

Shading correction unit 202 stores data obtained by reading white plate 21 for correction of shading (see FIG. 1) in an internal shading memory as reference data for each of R, G and B, prior to reading of an original. The reference data is converted to an inverse number and the inverse number is multiplied by data obtained by reading information on the original in order to make the shading correction. The data obtained after the shading correction is output to a line-to-line correction unit 203. The shading correction is carried out in order to eliminate an uneven amount of light in the main scan direction for R, G and B data.

Line-to-line correction unit 203 executes delay control of data on each color line by line using an internal field memory according to the scanning speed (corresponding to variable scale magnification in the subscan direction), in order to match positions of reading in the subscan direction (the arrow b of FIG. 1) by sensor chips for respective R, G and B in CCD 16.

A timing control unit 204 is connected to CCD 16, A/D conversion unit 201, shading correction unit 202 and line-to-line correction unit 203, and controls such that they operate synchronously with one another.

Data on each of colors R, G and B output by line-to-line correction unit 203 is supplied to a variable scale magnification-shift control unit 205, a line buffer unit 206 and a histogram generation unit 207.

Variable scale magnification-shift control unit 205 alternately inputs and outputs line by line using two line memories provided for variable scale magnification for each data on R, G and B. Variable scale magnification and shift in the main scan direction are handled by individually controlling timings of reading and writing. Each of the resultant data on R, G and B is output to an HVC conversion unit 209. In order to avoid any missing and irregularity of an image, interpolation process is applied before writing when the image is reduced, and before reading when the image is enlarged. Variable scale magnification-shift control unit 205 further carries out image repeating process, continuous enlargement process, and mirror image process.

Line buffer unit 206 stores image data on R, G and B corresponding to one line for variable scale magnification-shift control by control unit 205.

Histogram generation unit 207 generates a lightness signal from R, G and B data which has undergone the line-to-line correction upon a preliminary scanning of an original, and produces a histogram for the original. Using the histogram, a basis for determination at a ground color level of an original is automatically set, for a process of determining if the original is of a color image or a black and white image (ACS determination process), and a process of automatically skipping data at the ground color level of the original (AE process).

HVC conversion unit 209 converts each data on R, G and B to lightness data (V data) and a color difference signal (Cr, Cb data), and outputs the data after conversion to a delay memory A 210, an edit processing unit 211 and a paper money recognition unit 212.

Edit processing unit 211 receives each data of V, Cr and Cb and carries out an edit operation such as color changing and coloring of a closed loop region within a detected original based on specification by an editor (not shown) optionally provided for the apparatus.

Paper money recognition unit 212 determines if an original placed on platen 18 (see FIG. 1) is a paper money, securities or the like, and issues an instruction of inhibiting copying based on the result of the determination.

An image interface unit 228 receives V, Cr, and Cb data from delay memory A210, and transfers image data to an external unit 229. At this time, image interface unit 228 can convert the V, Cr and Cb data to X, Y and Z signals, L*, a* and b* signals and the like that correspond to a general purpose color space as required to output them to external unit 229, in order to accommodate to a color signal interface for various image data in external unit 229.

External unit 229 is provided separately from copying machine 1. External unit 229 may be a printer which makes a print of an image read by image reader IR, or a personal computer which transmits image data to copying machine 1 to be printed by printer PRT. Image interface unit 228 configured as described above allows the copying machine to accommodate to external unit 229 which is a printer, a display monitor or the like.

Further, image interface unit 228 can transfer each data on Bk, Y, M and C to be output to image memory 30 (described later) to external unit 229, or can convert Bk, Y, M, and C data output by external unit 229 to V, Cr, and Cb data for transfer to image memory 30.

One of data output by image interface unit 228 and edit processing unit 211 is selected to be input to an image composition unit 214 based on a selection signal and edit coordinate data specified by an editor (not shown). Image composition unit 214 carries out an image composition process (insertion, character composition and the like) using the input data and data supplied from HVC conversion unit 209 via delay memory A 210, and V, Cr, and Cb data obtained by the image composition process are output to an HVC adjustment unit 215. The V data is output to a region determination unit 225, and the Cb and Cr data are output to a polar coordinate conversion unit 224.

In order to make an image adjustment corresponding to three senses of a human that are the lightness (V:brightness), the hue (H:tint), and the color saturation (C:vividness), HVC adjustment unit 215 adjusts V, Cr and Cb data independently for H, V and C based on setting of operation panel 101. V, Cr, and Cb data obtained by the adjustment are output to an AE processing unit 216.

AE processing unit 216 controls the ground color level of an original for a lightness component based on the basis for determination of the ground color obtained by histogram generation unit 207. V, Cr and Cb data that have undergone control of the ground color level are output to an inverse HVC conversion unit 217. Inverse HVC conversion unit 217 converts V, Cr, and Cb data again to R, G and B data, and outputs the R, G and B data to an LOG correction unit 218 and a monochrome/monochrome color data generation unit 221.

LOG correction unit 218 converts the R, G and B data to density data (DR, DG, and DB) and outputs them to an UCR/BP processing unit 219.

Monochrome/monochrome color data generation unit 221 produces lightness data from the R, G and B data and further produces gradient data (DV) for monochrome reproduction from the lightness data, and outputs it to a color data selection unit 222.

A color correction unit is constituted of LOG correction unit 218, UCR/BP processing unit 219 and a masking processing unit 220.

Color saturation information of an original is obtained as a difference between the maximum value and the minimum value of the re-converted R. G and B data (MAX (R, G, B)-MIN (R, G, B)),and an under color component of an original is obtained as the minimum value of density data (MIN (DR, DG, DB)) supplied from LOG correction unit 218. UCR/BP processing unit 219 generates each of CO, MO, YO and Bk data obtained by applying the UCR•BP process (under color removal•black application) to DR, DG and DB data according to the original color saturation information and the under color component. The CO, MO and YO data are output to masking processing unit 220, and Bk data is output to a color data selection unit 222.

The maximum value and the minimum value of the R, G and B data are those of the density data read by preliminary scanning an original. The under color component is the minimum value of the density data (MIN (DR, DG, DB)). The under color removal refers to a process of removing the minimum value of the density data (MIN (DR, DG, DB)) from each data of R, G and B. The black application refers to a process of compulsively replacing a common component of the input R, G and B with a black component.

Masking processing unit 220 applies an operation process to the CO, MO and YO data in order to generate C, M and Y data for color reproduction corresponding to a color toner of a printer, and outputs the result of the operation to color data selection unit 222.

If a black and white copy mode is set with operation panel 101, or it is determined that an original is not a color original but a black and white original as a result of the ACS determination, color data selection unit 222 outputs DV data for monochrome to an MTF correction unit 226 via a delay memory B 223 according to the black and white copy mode. If it is determined that an original is a color original as a result of the ACS determination, color data selection unit 222 selectively outputs, according to the full-color mode, masking operation process data (C, M, Y data) for Y reproduction step or BP process data (Bk data) for Bk reproduction step, according to a reproduction step signal (CODE 1, 0) supplied from image reader control unit 401 (see FIG. 2), to MTF correction unit 226. The ACS determination is a process of determining if an original is a color original or a monochrome original by comparing the histogram generated by histogram generation unit 207 with a prescribed threshold value.

Polar coordinate conversion unit 224 converts the input Cr and Cb signals to polar coordinate data, and outputs generated W data to region determination unit 225.

Region determination unit 225 makes determination such as black character determination and dot determination by comparing V data output by image composition unit 214 and the W data output by polar coordinate conversion unit 224 with a prescribed threshold value. The result (JD signal) and correction data (USM signal) are output to MTF correction unit 226. Region determination unit 225 appropriately reproduces an image region and a character region upon image formation, and outputs LIMOS signal which allows a period of image reproduction upon printing to be variable to image memory 30 in order to keep the grainess of an image.

MTF correction unit 226 carries out processes such as edge enhancement, color bleeding correction, and smoothing by using the JD signal and USM signal output by region determination unit 225, for C, M, Y and Bk data output by delay memory B223. Correction unit 226 accordingly corrects the C, M, Y and Bk data to optimum data as a copy image. The corrected data is output to a γ correction/color balance adjustment unit 227.

γ correction/color balance adjustment unit 227 adjusts γ curve as well as the color balance of C, M, Y and Bk according to density level information input using operation panel 101, and outputs adjusted C, M, Y and Bk data to image memory 30. The C, M, Y and Bk data output by γ correction/color balance adjustment unit 227 are also transferred to external unit 229 via image interface unit 228 as described above.

Image signal processing unit 20 outputs, to image memory, C, M, Y and Bk data obtained by applying various corrections to image data from CCD 16 as well as the LIMOS signal which allows the period of image reproduction upon printing to be variable, as described above referring to FIG. 3.

Image memory 30 outputs those data to print processing unit 40, printer PRT is controlled according to the data, and copying machine 1 forms a full-color copy image of 400 dpi and 256 gradient.

Figure 4:
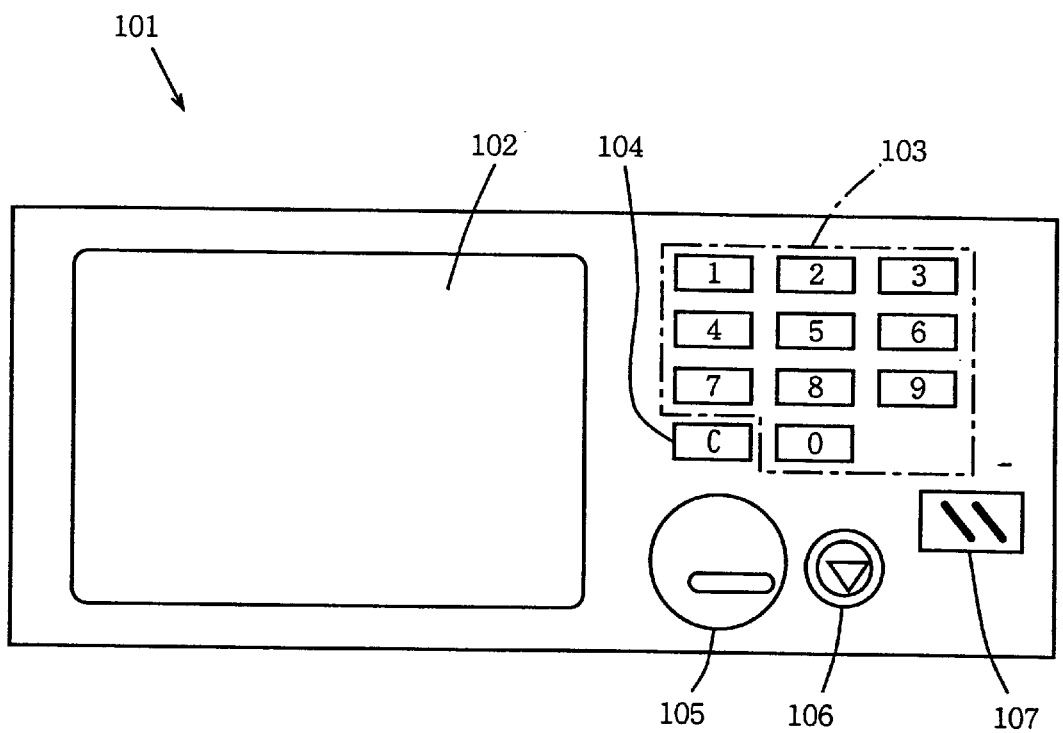
FIG. 4 shows an operation panel provided for the copying machine of FIG. 1.

FIG. 4 shows operation panel 101 provided to copying machine 1 of FIG. 1. Operation panel 101 includes a touch panel 102, a ten key 103, a clear key 104, a start key 105, a stop key 106 and a panel reset key 107.

Touch panel 102 is formed of LCD, for example, and various pictures and messages are displayed thereon. Ten key 103 is provided for inputting numerical values such as the number of prints to be made and print magnification. Clear key 104 is provided for returning the print number input by ten key 103 to "1" and for clearing the input print magnification. Start key 105 is provided for starting a print operation. A continuous printing operation is stopped by stop key 106. Panel reset key 107 is provided for clearing all of copying conditions which have been set and for returning to an initial state.

Figure 5:
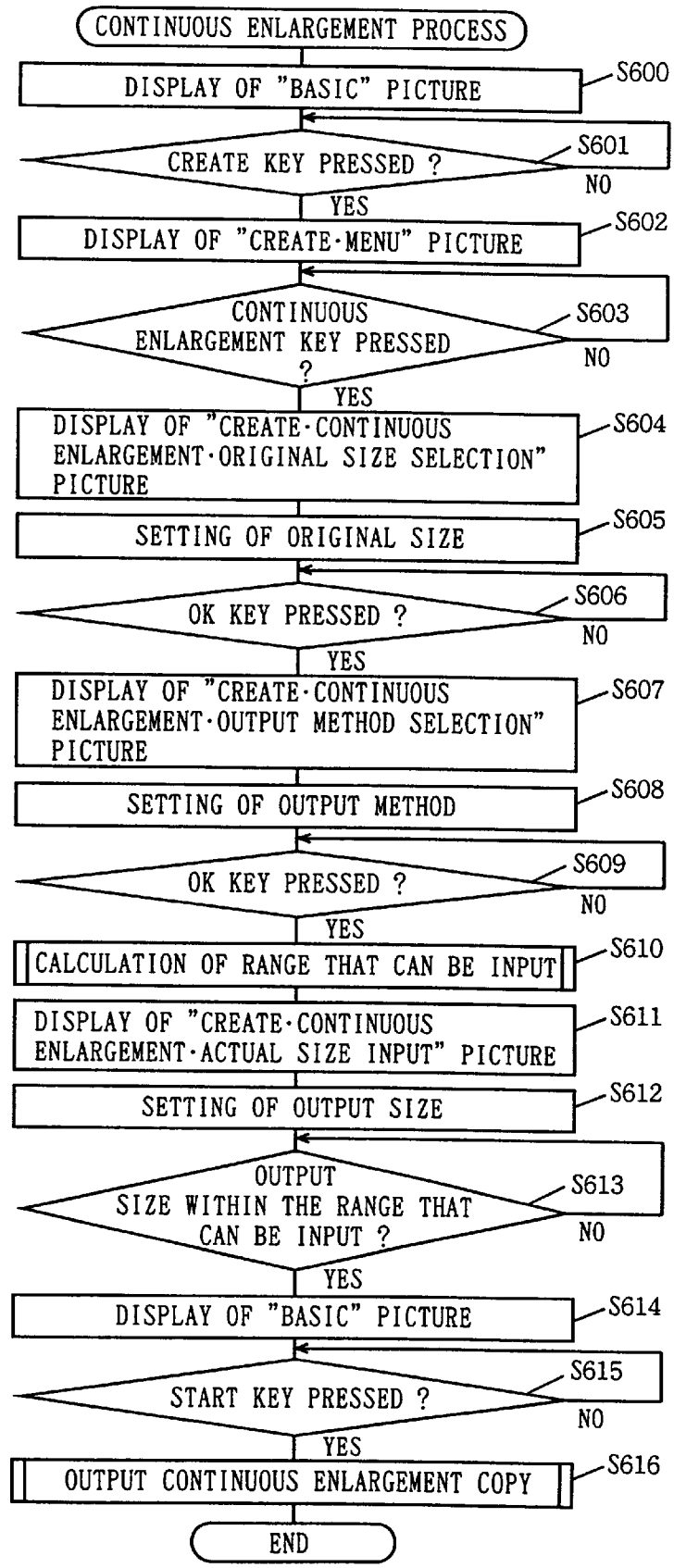
FIG. 5 shows a flow chart of a continuous enlargement processing of the copying machine of FIG. 1.

FIG. 5 shows a flow chart of the continuous enlargement process which is characteristic of copying machine 1, and FIGS. 6–11 each shows a display manner of touch panel 102 in the continuous enlargement process. Referring to FIGS. 5–11, the continuous enlargement process by copying machine 1 is described below. The continuous enlargement process is carried out by variable scale magnification•shift control unit 205 (see FIG. 3) of image signal processing unit 20 to convert data input by CCD 16 as described above according to an output size hereinafter described.

The continuous enlargement process by copying machine 1 refers to a process of enlarging an image of a piece of original and forming the image on a plurality of copy sheets. A copying machine such as copying machine 1 capable of executing the continuous enlargement process is referred to as "a copying machine having a continuous enlargement function."

"A piece of original" is herein referred to an amount of originals that can be placed on platen 18 at the same time. Since platen 18 is structured such that an original of up to the A3 size is placed thereon, two originals of the A4 size can be simultaneously arranged side by side on platen 18. If the two originals of the A4 size placed on platen 18 side by side are simultaneously read to be copied, "a piece of original" refers to the two originals of the A4 size arranged on platen 18 side by side.

Figure 6:
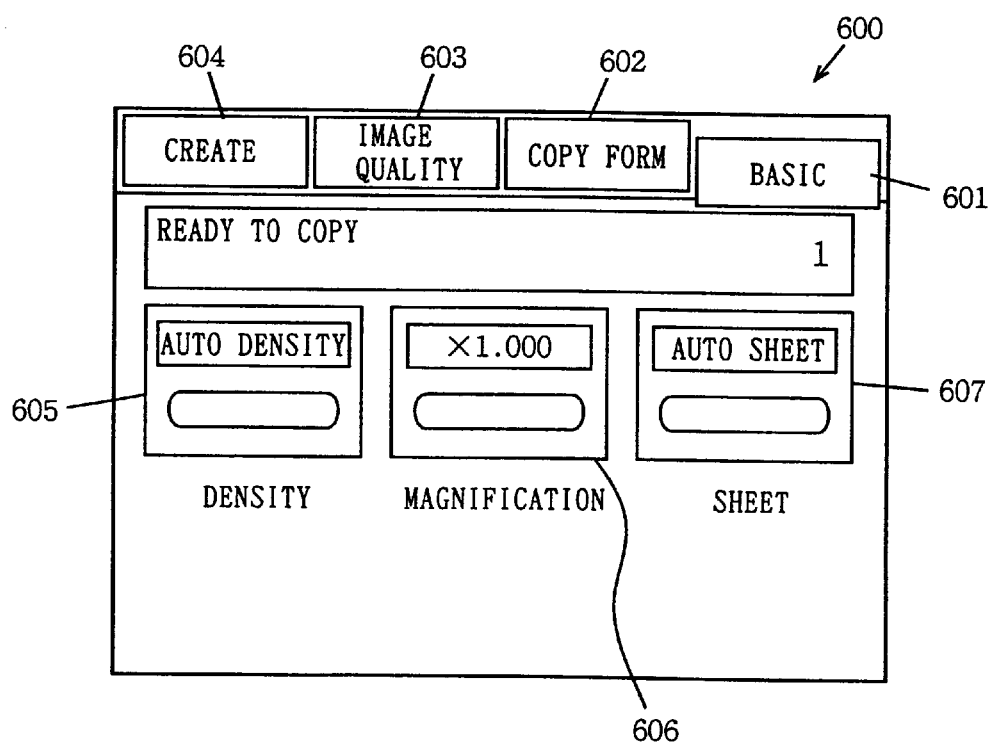
FIGS. 6–11 each show a display manner of a touch panel in the continuous enlargement processing of the copying machine of FIG. 1.

In step S ("step" is hereinafter omitted) 600, a basic picture is displayed on touch panel 102. FIG. 6 shows a basic picture 600. Basic picture 600 is provided for selecting a basic mode of copying machine 1. Copying machine 1 is structured such that basic picture 600 is displayed on touch panel 102 by pressing panel reset key 107 in any of a series of display manners described below.

A density key 605, a magnification key 606, and a sheet key 607 are displayed at basic picture 600 that are pressed when initial settings of the print density, the print magnification and the print sheet are to be respectively changed to be set. The density level information used for reference by γ correction/color balance adjustment unit 227 (see FIG. 3) is a setting of the density level made after pressing of density key 605. However, setting of the density level is made in a known manner and a detailed description thereof is not given.

In addition, a copy form key 602, an image quality key 603, and a create key 604 are displayed at basic picture 600 respectively for displaying a copy form menu, an image quality menu, and a create menu on touch panel 102. The copy form menu concerns combination of a type of an original and a desired type of copying, such as the two-sided copying by which an original is copied on both sides of a sheet, and a copying by which image information on two originals is copied on one sheet. The image quality menu is for changing the resolution of reading of an image, and appropriately selected by a user depending on the type of an original to be printed.

When the create key is pressed (YES in S601), S602 is next carried out in which the create menu is displayed on touch panel 102, and S603 is next executed.

Figure 7:
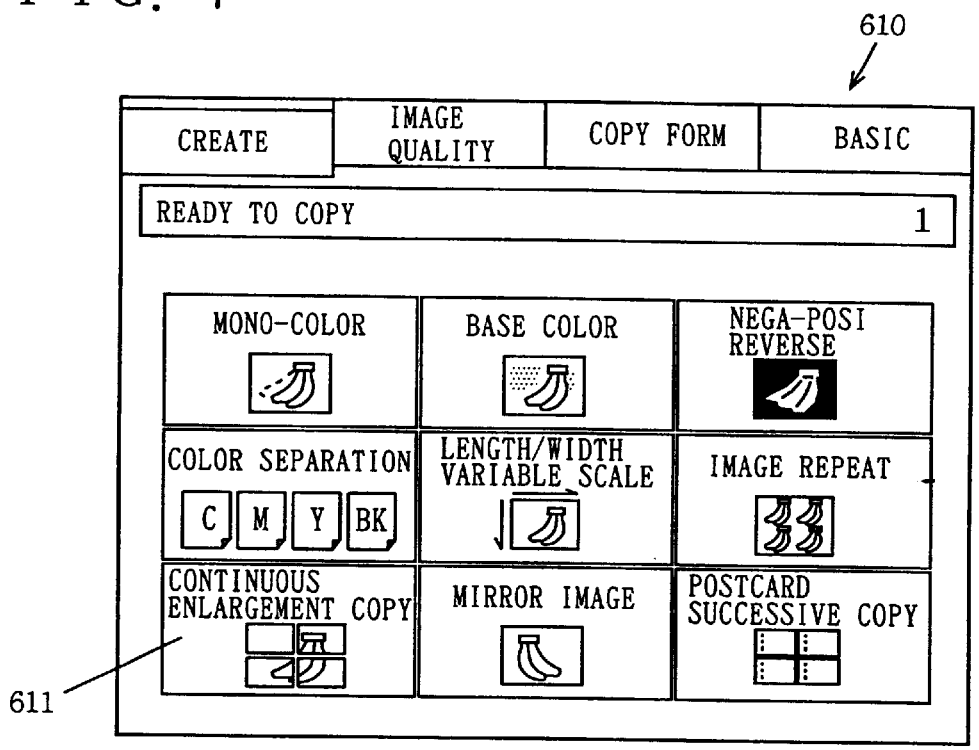

FIG. 7 shows a picture 610 displayed on touch panel 102.

In addition to a continuous enlargement key 611 for enlarging an image of an original and printing it on a plurality of sheets, a monochrome color key for printing an original of full-color with variation of density of a single color, a base color key for printing by applying a desired color to a background portion of an original, a negative-positive reverse key for printing by reversing a colored portion and a non-colored portion of an original, a color separation key for printing by separating an original of full-color into components of C, M, Y and Bk each one by one, a key for variable scale magnification for length and width for setting different printing magnifications respectively for the main scan direction and the subscan direction for an original, an image repeat key for repeatedly printing an image of an original on a single sheet at a plurality of times, a mirror image key for printing a mirror image of an original (an image of the original which is symmetrical with respect to the plane of platen 18), and a postcard successive copying key for repeatedly making prints of an image of an original with a postcard size, are displayed at picture 610.

Figure 8:
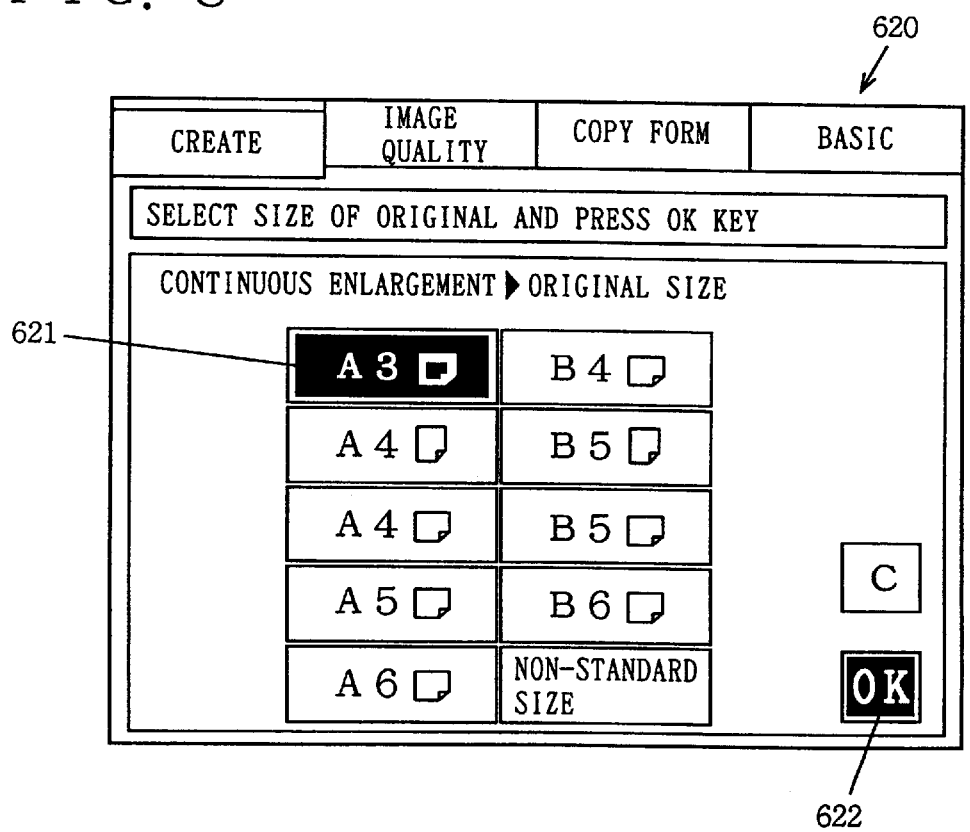

When continuous enlargement key 611 is pressed (YES in S603), "Create•Continuous Enlargement•Original Size Selection" picture is displayed. FIG. 8 shows "Create•Continuous Enlargement•Original Size Selection" picture 620.

Keys each indicating the size of an original such as A4 lengthwise, crosswise, B5 lengthwise, crosswise and the like including an A3 crosswise key 621 are displayed at picture 620 for inputting a size of an original when the continuous enlargement menu is selected. "Lengthwise" of the original size means that the main scan direction for an original corresponds to a longitudinal direction of the original, and "crosswise" means that the subscan direction corresponds to the longitudinal direction of the original.

A key corresponding to a selected original size (suppose that "A3 crosswise" is selected) is pressed (S605), an OK key 622 is pressed (YES in S606), and S607 is carried out in which a "Create•Continuous Enlargement•Output Method Selection" picture is displayed.

Figure 9:
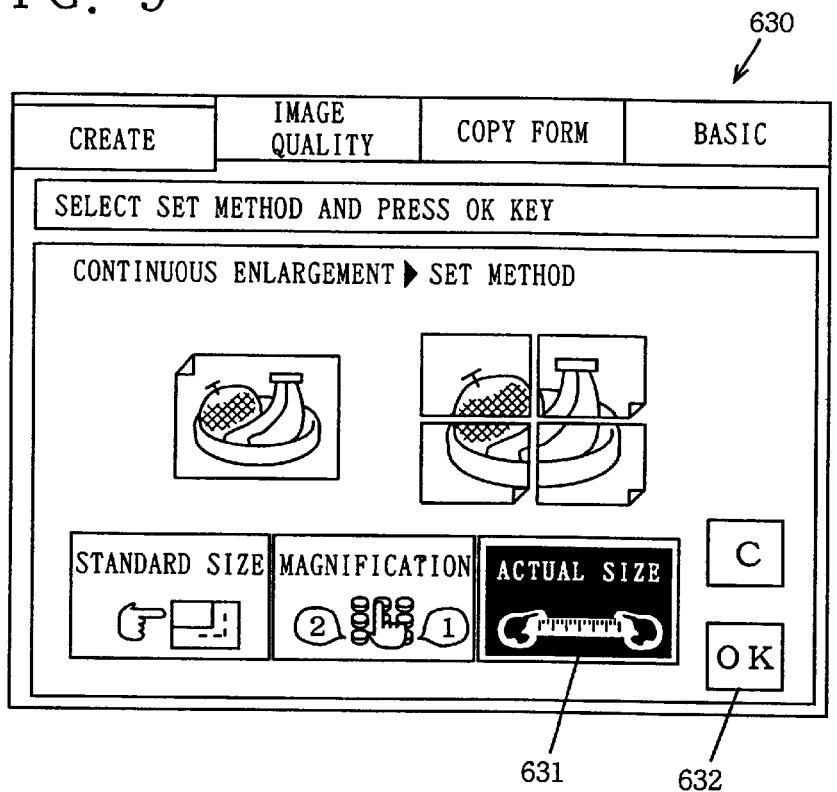

FIG. 9 shows a "Create•Continuous Enlargement•Output Method Selection" picture 630.

An actual size key 631 for inputting a size of an image to be output for an original by numerical input with ten key 103, a standard size key for specifying an image size to be output by the standard size of a sheet, and a magnification key for specifying an image size by a magnification are displayed at picture 630.

An output method is set (S608) by pressing a key corresponding to a desired output method selected from actual size key 631, the standard size key and the magnification key in S607 (suppose that the actual size key which is indicated by black-white reversed display is pressed). If OK key 632 is pressed (YES in S609), S610 is carried out in which a range of a size of an image to be output (output size) which can be input is calculated, and S611 is carried out.

The output size refers to a region where an image is output when an image of an original is enlarged to be output on a print sheet.

The calculation of the range which can be input is separately carried out for each of the main scan direction and the subscan direction of an original.

The calculation of the range which can be input is carried out considering the original size set in S605 and enlargement ability of copying machine 1. The original size set in S605 is selected from the standard sizes displayed at picture 620 (see FIG. 8). However, the original size can be directly input for respective distances in the main scan direction and the subscan direction by pressing the non-standard size key of picture 620.

The continuous enlargement function of copying machine 1 allows the number of print sheets used for one original to be four or less, and allows copying at variable scale magnification (i.e. reduction or enlargement) to be at 0.5–2.0 times the original size in both of lengthwise and crosswise directions. Therefore, if an original size is input as 100 millimeters (hereinafter described as "mm") in both of the lengthwise and crosswise directions, a range of an output size which can be input is determined to be 50–200 mm.

Suppose that a print sheet of a size which is the A3 crosswise at maximum can be used for copying machine 1. When an original of the A5 crosswise is to be printed by the continuous enlargement function, an output size corresponding to an enlargement magnification of 4.0 in both lengthwise and crosswise directions can be input, if the maximum four sheets of A3 crosswise as the maximum print sheet size which can be placed are used. However, since the maximum magnification which is possible for copying machine 1 is 2.0, such an output size is out of the range which can be input when A5 crosswise is input as an original size.

In S611, "Create•Continuous Enlargement•Actual Size Input" picture is displayed on touch panel 102, and S612 is next carried out.

Figure 10:
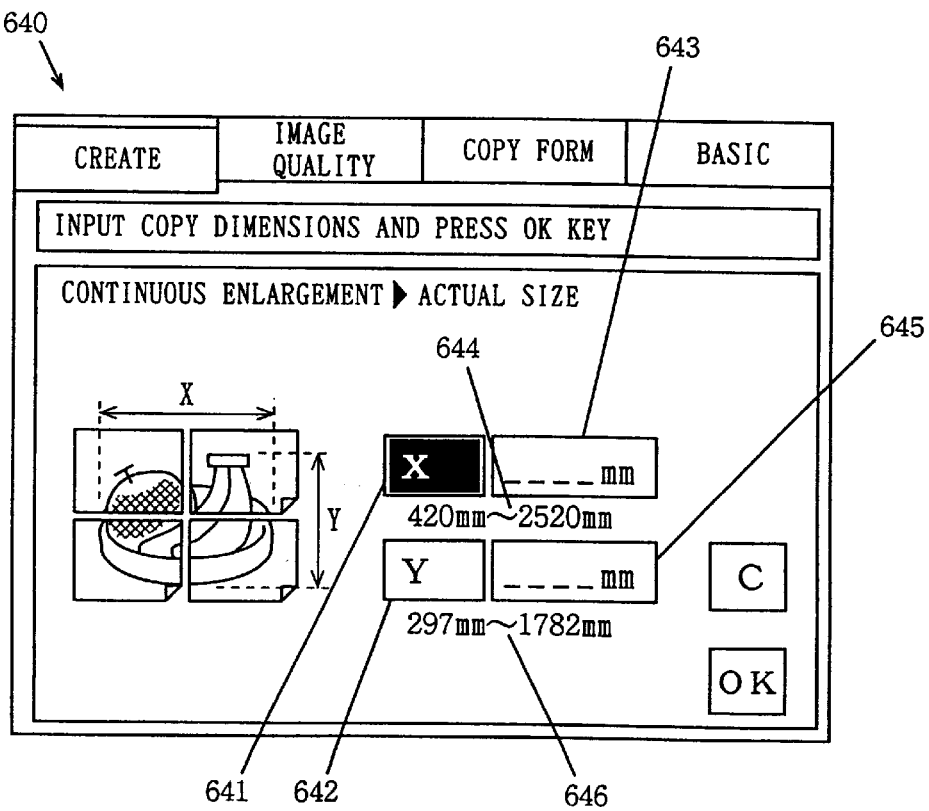

FIG. 10 shows the "Create•Continuous Enlargement•Actual Size Input" picture 640. Picture 640 is provided for setting the output size as described above by input thereof.

An x size setting section 643 for input of an output size in a x direction (e.g. main scan direction) of an original, as well as a size setting section 645 for input of an output size in a y direction (e.g. subscan direction) of an original are displayed at picture 640. Output sizes in the x direction and the direction are respectively input by pressing x key 641 and key 642 to make inverted displays and using ten key 103 (see FIG. 4). Both sizes can be input with a unit of mm.

Below respective x size setting section 643 and y size setting section 645, display sections 644 and 646 are provided each showing a range of an output size that can be input in each of x and directions obtained as the result of the operation in S610. FIG. 10 shows a range of the output size that can be input with respect to the x direction as 420–2520 mm, and a range of the output size that can be input with respect to the direction as 297–1782 mm. Using copying machine 1, the output size in each of and x directions can be input as an arbitrary value with a unit of mm if the output size is within the range that can be input described above. Accordingly, an enlargement magnification of an image of an original in the continuous enlargement process is automatically determined independently for each of the lengthwise and the crosswise directions according to the output size which has been input.

In S612, an output size is set (input) using "Create•Continuous Enlargement•Actual Size Input" picture, and S613 is next carried out.

Figure 11:
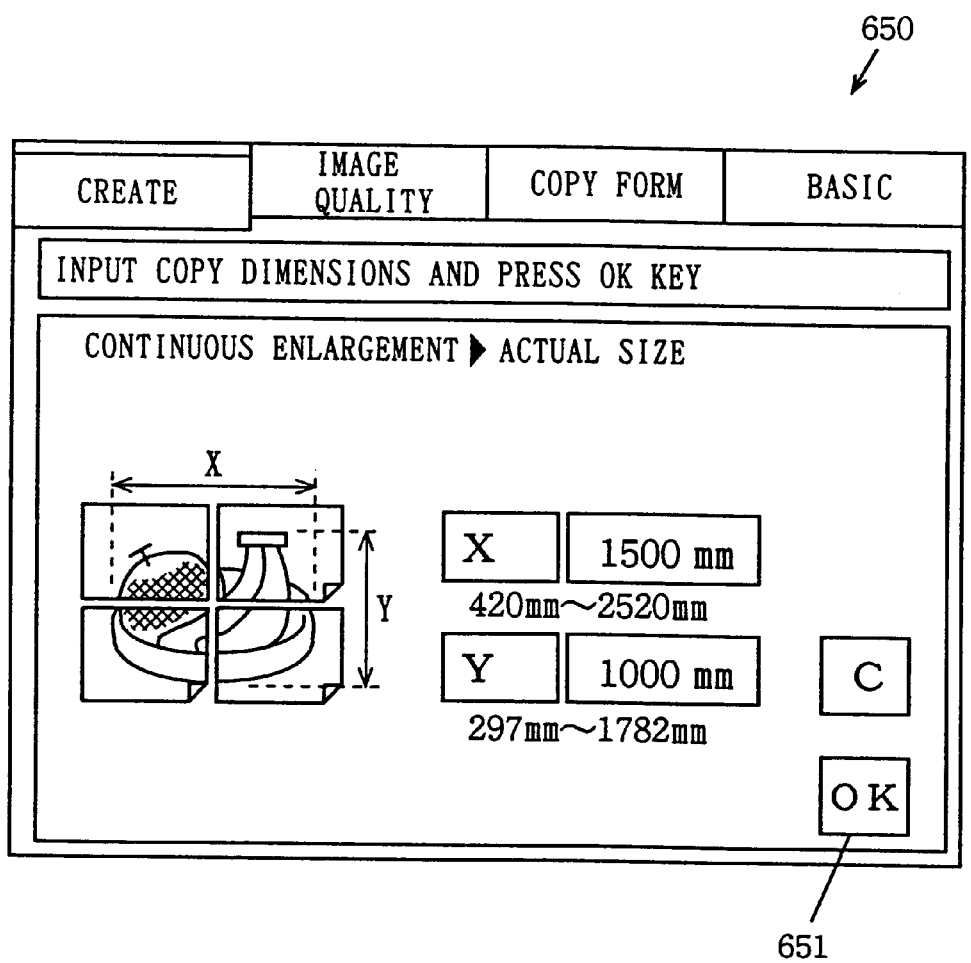

When an output size is set (input) in S612, picture 640 of FIG. 10 changes to a picture 650 of FIG. 11. Picture 650 of FIG. 11 shows an output size in the x direction input as 1500 mm and an output size in the y direction input as 1000 mm.

As shown in FIG. 11, when an OK key 651 is pressed with an output size set (input) using "Create•Continuous Enlargement•Actual Size Input" picture, it is determined that whether the output size set (input) in S612 is within a range which can be input obtained as a result of operation in S610 or not in S613. If the output size is within the range, S614 is carried out in which "basic" picture 600 of FIG. 6 is displayed on touch panel 102 (see FIG. 4), and S615 is next carried out. If the input size is out of the range, S612 is carried out again until an output size within the range is input.

After each condition in the continuous enlargement process described above is set, if pressing of start key 105 is confirmed (YES determination) in S615, S616 is carried out in which printing by the continuous enlargement function is executed according to each condition which has been set, and the continuous enlargement process is completed.

Using copying machine 1 according to this embodiment, an image can be formed by the continuous enlargement process with an arbitrary output size input by a user within a range that can be input obtained by operation process S610. Accordingly, an image can be formed by the continuous enlargement process with an output size desired by a user.

Using copying machine 1, an arbitrary size of an original can be input by pressing the non-standard size key of picture 620 if the original is not of the standard size.

According to this embodiment, an output size arbitrarily input by a user is for enlargement of an image of an original. However, the present invention is not limited thereto. An image of an original may be reduced if an image size of an original is changed to form the image on copy sheets of the number different from that of the original.

Using copying machine 1, the continuous enlargement process can be applied to data input by external unit 229. In this case, a data input section is constituted of image interface unit 228.

According to this embodiment, a size of an output image is input separately for the lengthwise direction and the crosswise direction. However, one of the sizes in the lengthwise and the crosswise directions may be automatically calculated, if the other size is input, from a ratio of a lengthwise distance to a crosswise distance of an input image.

According to the embodiment, a size of an original is input using the operation panel. However, a size of an original placed on the platen may be automatically detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image output apparatus comprising:

image input means for inputting an image in a lengthwise direction and a crosswise direction;

input image size input means for inputting a size of the image input to said image input means;

calculation means for calculating a range of a dimensional size of an image which can be output, based on said input size of the image, said calculation means separately calculating a range in the lengthwise direction and in the crosswise direction; and display means for displaying the range of the dimensional size of the image which can be output, calculated by said calculation means.

2. The image output apparatus according to claim 1, further comprising:
output image size input means for inputting a size of an image to be output;
image size change means for changing the size of the image input to said image input means, based on the size inputted by said output image size input means; and
output means for outputting the image with its size changed.

3. The image output apparatus according to claim 1, wherein
said input image size input means is capable of inputting a prescribed standard size of a sheet.

4. The image output apparatus according to claim 2, wherein
said output image size input means inputs lengthwise and crosswise distances of an image to be output by numerical values.

5. The image output apparatus according to claim 2, wherein
said image size change means enlarges the size of said input image.

6. The image output apparatus according to claim 5, wherein
said output means outputs an image of a size enlarged by said image size change means by dividing the image into a plurality of sheets.

7. The image output apparatus according to claim 2, wherein
said image size change means reduces the size of said input image.

8. The image output apparatus according to claim 2, wherein
said output image size input means can input one of lengthwise and crosswise distances of an image to be output, and the other distance which is not input is calculated according to a ratio of a lengthwise distance to a crosswise distance of the size of said input image.

9. An image forming apparatus comprising:
image reading means for reading an image of an original in a lengthwise direction and a crosswise direction;
original image size detection means for detecting a size of said image of the original;
calculation means for calculating a range of a dimensional size of an image which can be output, based on said detected size of the image of the original, said calculation means separately calculating the range of dimensional size of an image which can be output in the lengthwise direction and in the crosswise direction;
display means for displaying said range of dimensional size of the image which can be output;
output image size input means for inputting a size of an image to be output;
output images size control means for controlling said output image size input means to reject input of a size that is outside of said range of dimensional size of the image displayed by the display means;
image size change means for changing said size of the image of the original, based on the dimensional size inputted by said output image size input means; and
output means for outputting the image with its size changed by said image size change means.

10. The image forming apparatus according to claim 9, wherein
said output image size input means inputs lengthwise and crosswise distances of an image to be output by numerical values.

11. The image forming apparatus according to claim 9, wherein
said image size change means enlarges the size of the image of the original.

12. The image forming apparatus according to claim 11, wherein
said output means outputs an image of a size enlarged by said image size change means by dividing the image into a plurality of sheets.

13. The image forming apparatus according to claim 9, wherein
said image size change means reduces the size of the image of the original.

14. The image forming apparatus according to claim 9, wherein
one of lengthwise and crosswise distances of an image to be output is input by said output image size input means, and the other distance which is not input is calculated according to a ratio of a lengthwise distance to a crosswise distance of the image of the original.

15. A method of outputting an image, comprising the steps of:
inputting an image in a lengthwise direction and a crosswise direction;
inputting a size of the input image;
calculating a range of a dimensional size of an image which can be output, based on the size of the input image, said calculation being made separately for a range of a size of an image which can be output in the lengthwise direction and in the crosswise direction;
displaying the calculated range of the dimensional size of the image which can be output;
inputting a size of an image to be output;
changing the size of the input image based on the input size of the image to be output; and
outputting an image with its size changed.

16. A method of forming an image comprising the steps of:
reading an image of an original in a lengthwise direction and a crosswise direction;
detecting a size of the image of the original;
calculating a range of a dimensional size of an image which can be output, based on the detected size of the image of the original, said calculation of a range of a dimensional size of an image which can be output being made separately for the lengthwise direction and the crosswise direction;
displaying the calculated range of the dimensional size of the image which can be output;
inputting a size of an image to be output;
rejecting input of a size that is outside of the displayed range of the dimensional size of the image which can be output;
changing the detected size of the image of the original based on the input size of the image to be output; and
outputting an image with its size changed.

17. The image output apparatus of claim 1 wherein said input image size input means permits input of an arbitrary size of an original.

18. The method of claim 15 wherein the step of inputting a size of the input image includes the step of operator input of an arbitrary size of an original.

19. An image processor comprising:

image input portion for inputting image data of an original image;

size input portion for inputting a size of the original image;

calculator for calculating a range of a dimensional size of an image which can be output, based on the size of the original image input by said size input portion, said calculator separately calculating the range of the dimensional size of the image which can be output in a length direction and in a width direction; and display for displaying the range of the dimensional size of the image which can be output in the length direction and in the width direction, calculated by said calculator.

\* \* \* \* \*